POWER INTEGRATED GYROSCOPIC DEVICE

Filed Feb. 5, 1969 6 Sheets-Sheet 1

INVENTOR.
AXEL CAMPBELL

POWER INTEGRATED GYROSCOPIC DEVICE

Filed Feb. 5, 1969

6 Sheets-Sheet 3

*Axel Campbell* INVENTOR.

BY *Alfred E. Miller*

ATTORNEY

Oct. 13, 1970 A. CAMPBELL 3,533,187

POWER INTEGRATED GYROSCOPIC DEVICE

Filed Feb. 5, 1969

6 Sheets-Sheet 4

AXEL CAMPBELL INVENTOR.

BY Alfred E. Miller

ATTORNEY

Oct. 13, 1970 A. CAMPBELL 3,533,187

POWER INTEGRATED GYROSCOPIC DEVICE

Filed Feb. 5, 1969

6 Sheets-Sheet 5

AXEL CAMPBELL INVENTOR.

BY

Alfred E. Miller

ATTORNEY

AXEL CAMPBELL *INVENTOR.*

*BY* Alfred E. Miller

ATTORNEY

United States Patent Office 3,533,187

Patented Oct. 13, 1970

3,533,187

POWER INTEGRATED GYROSCOPIC DEVICE

Axel Campbell, P.O. Box 529, Greenwich, Conn. 06830

Continuation-in-part of application Ser. No. 690,610, Dec. 14, 1967. This application Feb. 5, 1969, Ser. No. 813,787

Int. Cl. A63h *33/00*

U.S. Cl. 46—243 21 Claims

ABSTRACT OF THE DISCLOSURE

The disclosed gyroscopic device comprises a small D.C. motor centrally mounted in a balanced rotor body having incorporated therein at least one battery electrically connected to supply electrical energization to the motor. The extended motor armature shaft constitutes the spin axis about which the rotor body spins. At least one battery and means for counter-balancing are positioned about the spin axis and revolve in a plane perpendicular thereto. A switch centrally mounted on top of the rotor body is movable parallel to the spin axis to selectively supply electrical energization from the battery to the D.C. motor.

This application is a continuation-in-part application of my U.S. patent application Ser. No. 690,610, filed Dec. 14, 1967.

BACKGROUND OF THE INVENTION

Gyroscopic devices such as gyroscopes, stabilizers, toy tops, etc., have heretofore been dependent on externally applied power for imparting and sustaining rotation. This situation is exemplified in the case of toy gyroscopes and tops wherein a pull-string is used to impart spinning motion. Similarly, the electrical motors powering gyroscopes, stabilizers, etc., receive electrical energization from external sources.

My invention provides a completely portable, compact motorized gyro in which motorization is provided by a D.C. motor supplied from at least one battery and counterbalancing means incorporated in the gyro rotor. The gyro is thus a self-contained, motorized unit with the battery, and counterbalancing means positioned about its spin axis also serving as added mass to increase the rotor's moment of inertia and radius of gyration. This provides increased permanence of direction of the spin axis or rigidity of the rotor. Consequently, a gyro constructed according to my invention has inherent stability.

A simple electrical switch arrangement is provided for selectively completing the circuit between the batteries and the motor. Thus, once the switch is closed, the gyro continues to spin without human intervention for as long as the batteries hold up.

A gyro of my invention is simple in construction and inexpensive of manufacture.

While the disclosed embodiment of my invention is that of a toy gyro, it will be appreciated that the principles of my invention are readily conducive to other applications. The gyroscopic characteristics of my invention may be employed to stabilize a hand-held or platform-mounted device, such as a camera or the like, against vibration and other forms of motional agitation. The teachings of my invention could also be used in constructing a portable, self-contained, gyrocompass. Due to the relatively high rotational momentum of the rotor constructed according to my invention, application to certain portable power tools where this characteristic is of significant advantage is contemplated. Moreover, the advantages of my invention readily suggest itself to use as a portable electromotive power source with the batteryweighted rotor serving as a flywheel operating to steady the output speed and to overcome the effects of varying output power demands.

The invention accordingly comprises the features of construction, combination of elements and arrangement of parts which will be exemplified in the construction hereinafter set forth, and the scope of the invention will be indicated in the claims.

For a fuller understanding of the nature of the invention, reference should be had to the following detailed description taken in connection with the accompanying drawings, in which.

Figures 6, 9A, 9B:
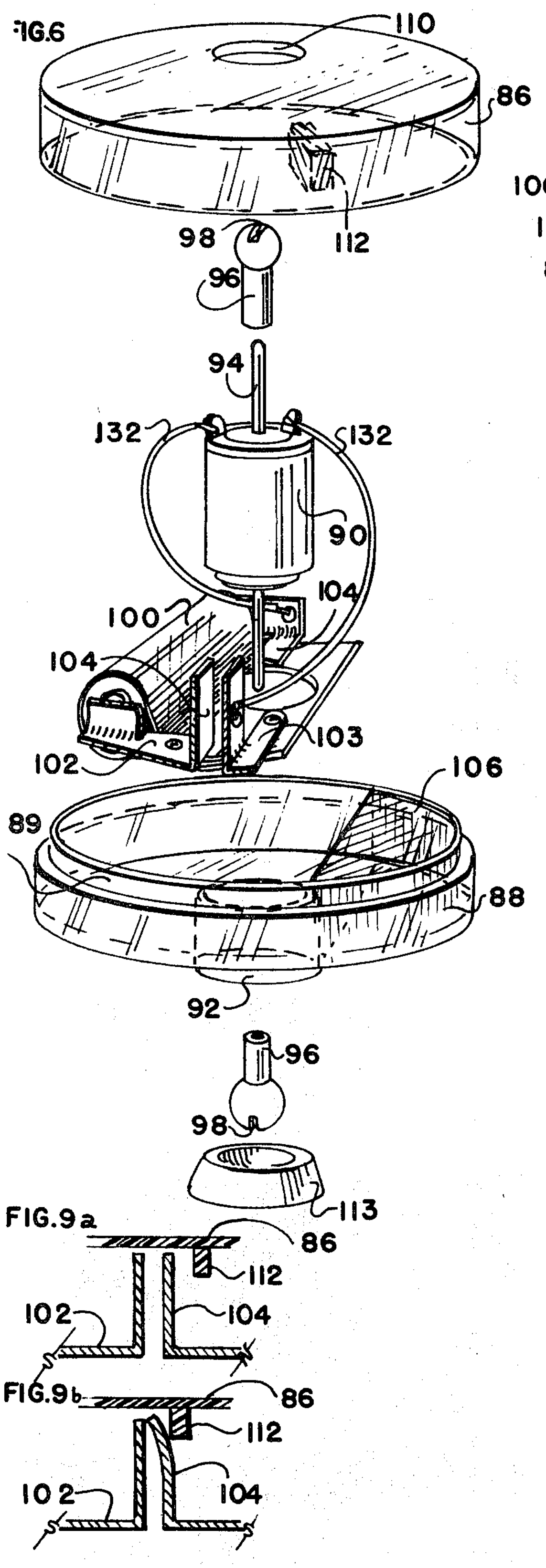
FIG. 6 is an exploded view of an alternate construction embodying the principles of my invention.
Figure 7:
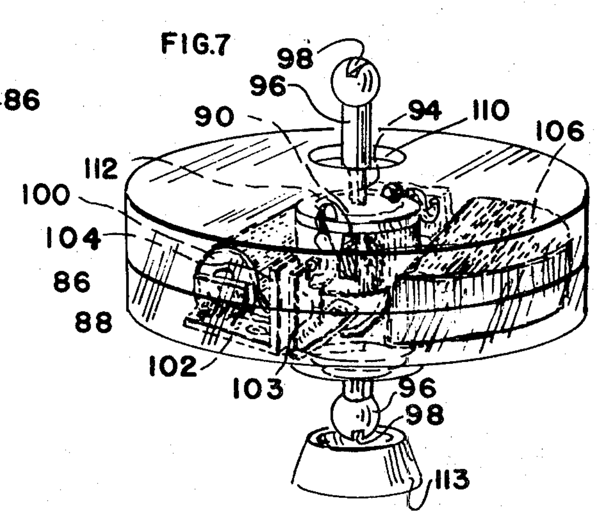
FIG. 7 is a perspective view of the construction shown in FIG. 6, in an assembled condition.
Figures 10, 10A, 11, 12, 13, 14, 15, 16, 17:
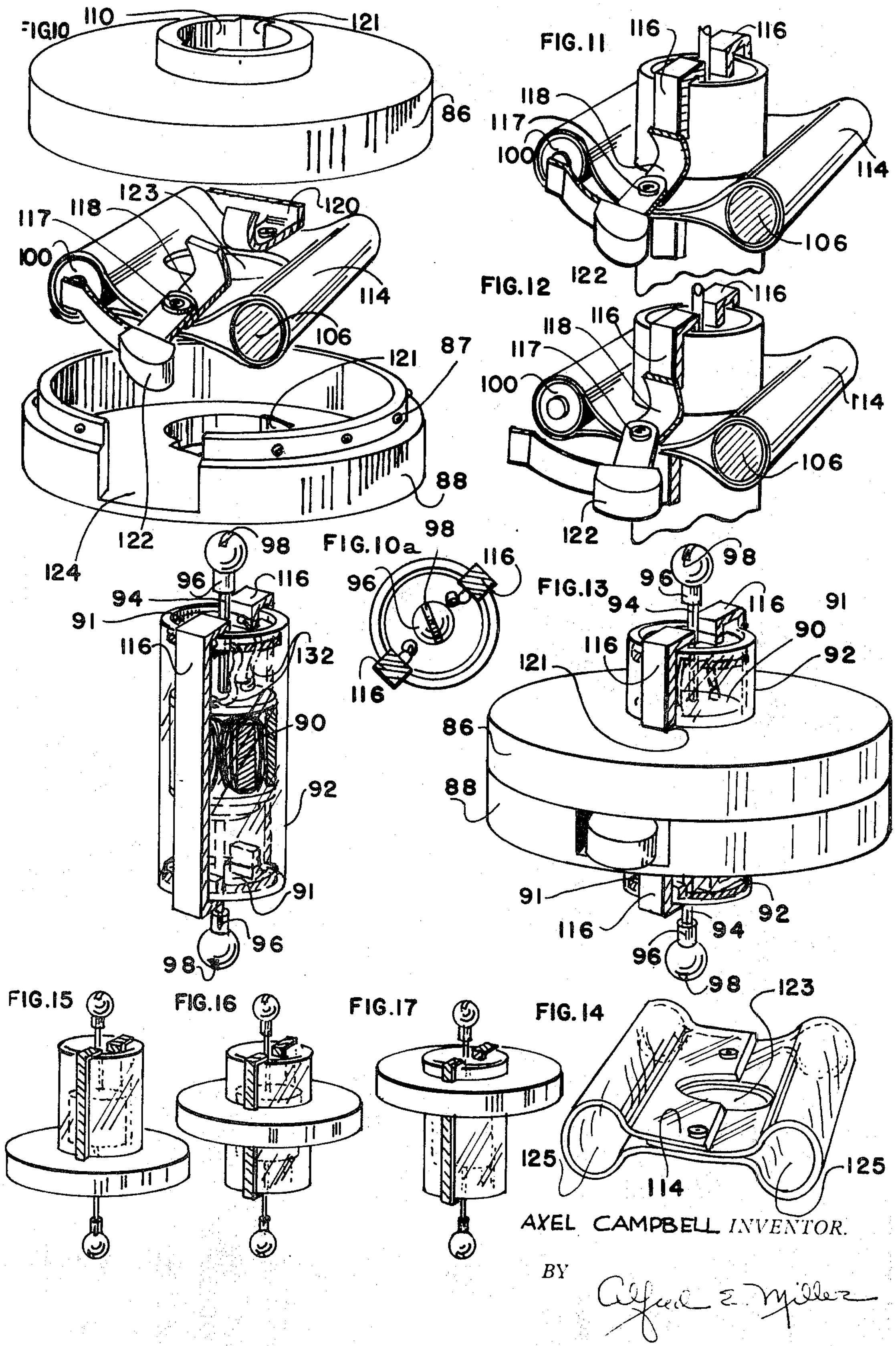
Figures 18, 19, 20, 21, 22, 23, 24:
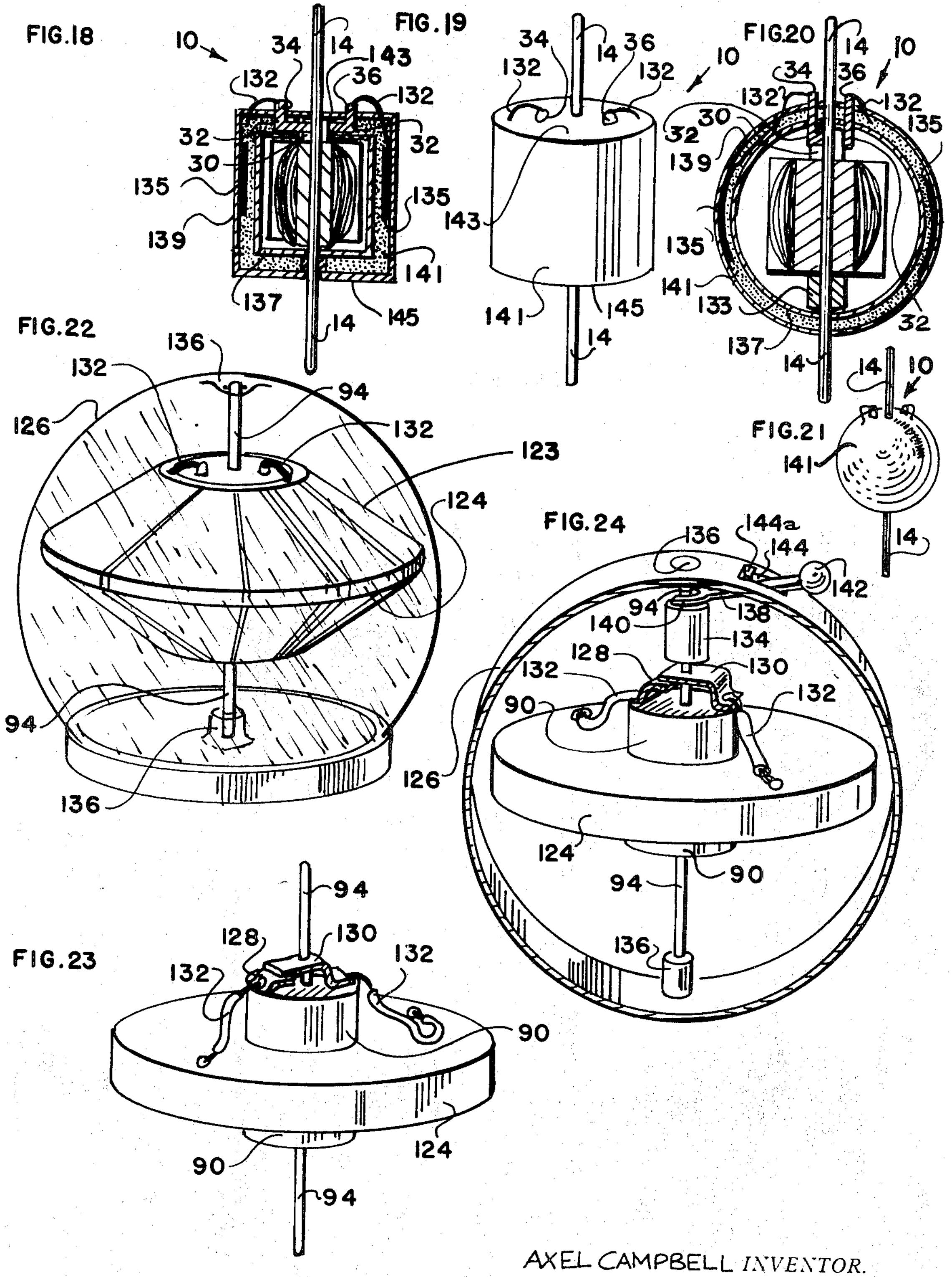

FIGS. 9*a* and 9*b* are diagrammatic views of the switch shown in FIGS. 6 and 7 in two positions, respectively;

FIG. 10 is an exploded view of another embodiment of the present invention;

FIG. 10*a* is a top view of the construction shown in FIG. 10 in an assembled condition;

FIGS. 11 and 12 are perspective views of a detail of construction of FIG. 10 in two conditions;

FIG. 13 is a perspective view of the assembled construction shown in FIG. 10;

FIG. 14 is a perspective view of the battery harness construction shown in FIGS. 10, 11 and 12;

FIGS. 15, 16 and 17 are perspective views of the construction of FIG. 13, with the rotor located in different positions relative to the motor housing;

FIGS. 18 and 19 are cross-sectional and perspective views respectively of another embodiment of the present invention in which the electroproductive source is internal;

FIGS. 20 and 21 are cross-sectional and perspective views respectively of a variation of the construction illustrated in FIGS. 18 and 19;

FIG. 22 is a perspective view of another embodiment of the present invention;

FIGS. 23 and 24 are perspective views of still another embodiment of the present invention; and FIGS. 25–28 are perspective views illustrating some of the uses of the present invention.

Similar reference numerals refer to similar parts throughout the several views of the drawings.

DETAILED DESCRIPTION OF THE PREFERRED EMBODIMENT

Figure 1:
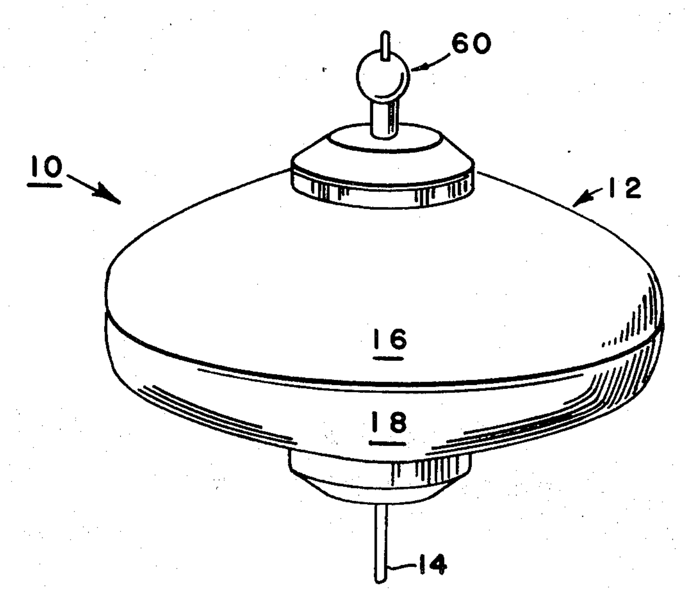
FIG. 1 is a perspective view of a gyro constructed according to my invention.

The gyro, generally indicated at 10 in FIG. 1, comprises a rotor body, generally indicated at 12, adapted to spin about its vertical axis, thereby to sustain the gyro in an upright attitude while supported on a downwardly extending spin axis member 14. It will be appreciated that for other uses of my invention, the spin axis may be in any orientation.

Figure 2:
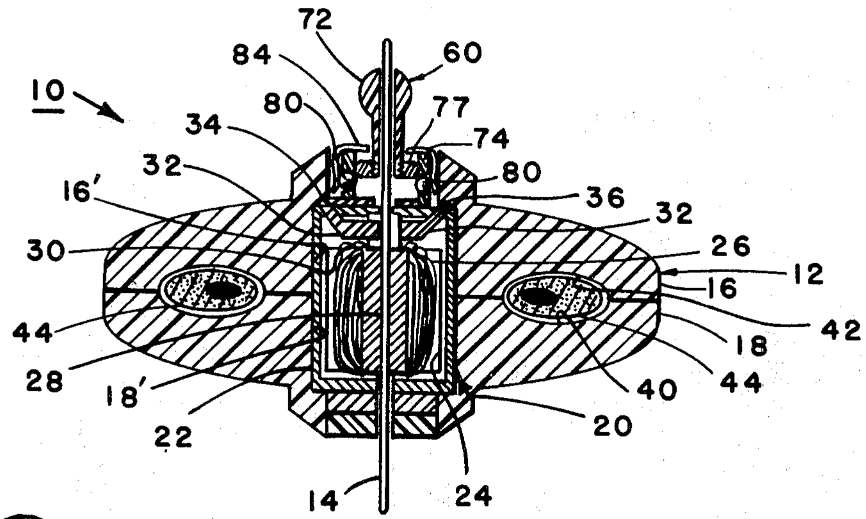
FIG. 2 is a vertical sectional view taken through the center of the gyro of FIG. 1.
Figure 3:
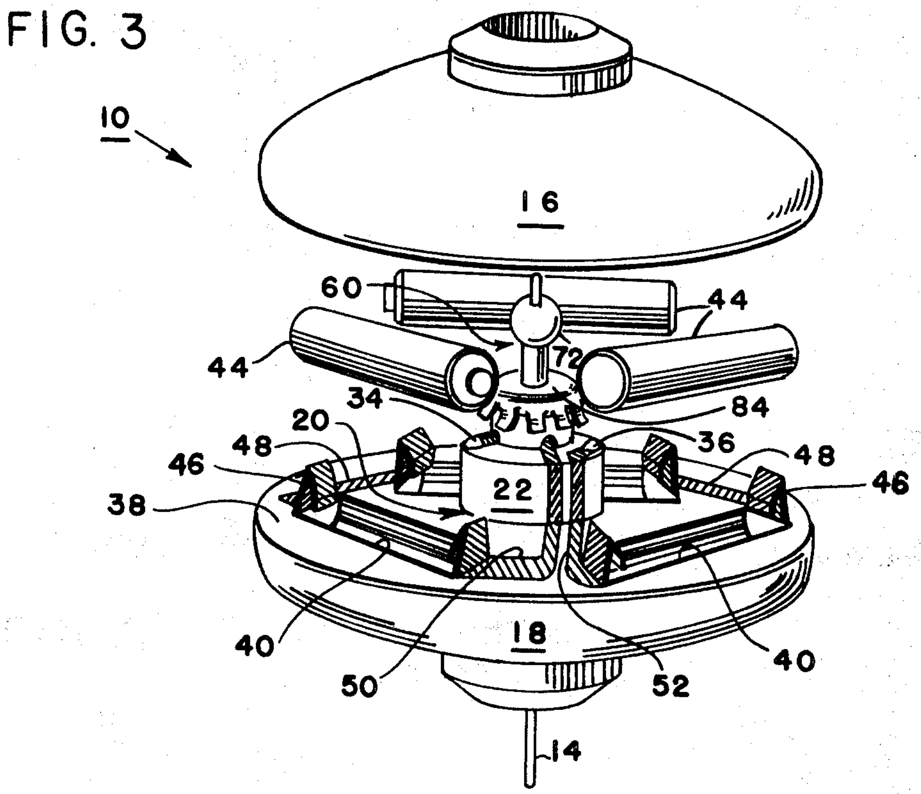
FIG. 3 is an exploded view of the gyro of FIG. 1.

As best seen in FIGS. 2 and 3, the rotor body 12 consists of an upper half 16 and a lower half 18. Both rotor body halves are formed having concentric central openings 16′ and 18′ which serve to accommodate a D.C.- motor generally indicated at 20. This D.C. motor is of conventional construction comprising a cylindrical housing 22 supporting a motor stator field 24 and a wound armature 26 mounted on an armature shaft 28 journalled by the end walls of the motor housing. The lower extension of the armature shaft 28 corresponds to the spin axis member 14. The motor 20 further includes a commutator 30 rotating with the armature shaft 28 and brushes 32 contacting the commutator to connect the external terminals 34 and 36 to the windings of armature 26.

Figure 4:
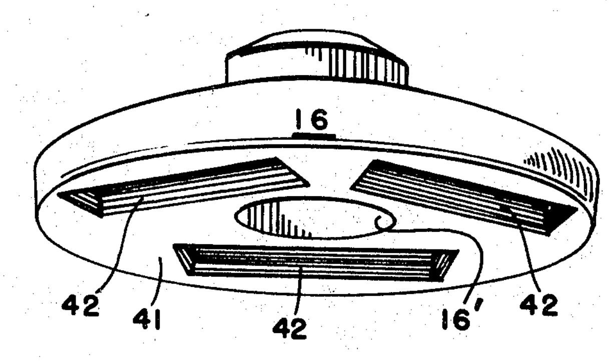
FIG. 4 is a perspective view showing the underside of the upper half of the rotor body incorporated in the gyro of FIG. 1.

The upper surface 38 of rotor half 18 is formed with a plurality of recesses 40. Similarly, the under surface 41 of rotor half 16 is formed having recesses 42 (FIG. 4) corresponding in number and shape to recesses 40. These recesses form a plurality of cavities when the rotor halves are in juxtaposition, each cavity accommodating a dry cell battery 44 as shown in FIGS. 2 and 3. While three batteries 44 are shown, it will be appreciated that my invention can employ any number. In fact, with proper counterbalancing, a single battery could be used.

Each recess 40 has stationed at each end an electrically conducting resilient contact member 46 for electrically contacting the terminals of the batteries 44 when positioned in the recesses (FIG. 3). Contact strips 48 imbedded in the upper surface 38 of rotor half 18 and running between contact members 46 electrically connect the batteries 44 in series. As seen in FIG. 3, contact strips 50 and 52 run radially inward and up over the motor housing 22 to motor terminals 34 and 36. The series connected batteries 44 are thus electrically connected across the input terminals of the motor 20.

Figure 5:
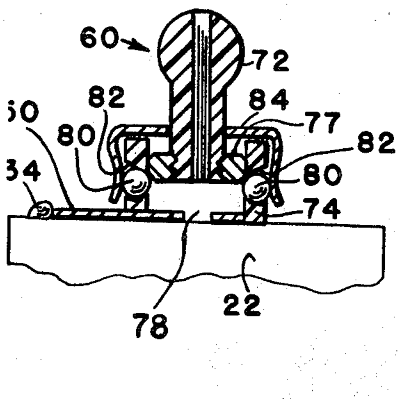
FIG. 5 is an enlarged fragmentary, sectional view of the switch construction shown in FIG. 2.

In order to selectively break the circuit between the batteries 44 and the motor 20, a switch mechanism, generally indicated at 60, is mounted on the upper end wall of the motor housing 22. The switch mechanism 60, best seen in FIG. 5, includes a switch operator member 72 having an axial bore through which the armature shaft 28 extends. The switch operator member is vertically movable in a sleeve 74. The lower end of the operator member carries an annular ring 77 which is adapted to bridge a gap 78 in the conductor strip 50 extending across the lower end of the sleeve 74. It is seen in FIGS. 2 and 5 that when the switch operator 72 is pushed downwardly, the ring at the lower end thereof electrically bridges the gap 78 in conductor strip 50. A detent arrangement in the form of a pair of balls 80 retained in conical openings 82 formed in sleeve 74 by an annular spring member 84 retains the switch operator 72 either in its upper or lower positions.

In operation of the gyro 10, the switch operator 72 is pushed downwardly to complete the circuit between the batteries and the D.C. motor 20. The upper end portion of the armature shaft 28 extending above the switch operator 72 is held and the motor housing 22 and the rotor body 12 rotate about the armature shaft in unison. The end of the spin axis member 14 is then rested on a surface and the gyro sustains itself in a generally upright attitude by virtue of the rapid spinning of the rotor body about the spin axis.

It will be apparent from the above description and the principles of operation of my invention that the batteries need not be horizontally oriented while in asymmetrical array about the spin axis. They could also be vertically or radially symmetrically arrayed thereabout. It is also envisioned that rather than individual dry cell batteries, an annular array of battery packs could also be incorporated in the rotor.

Moreover, it will be seen that the spin axis member 14 could be connected to the motor housing while the rotor body 12 connects to the armature shaft 28. In this form, the stator field would be stationary while the rotor body rotated with the armature shaft 28. Slip rings would then be used to transmit electrical energization from the batteries to the motor windings.

It will also be appreciated that the batteries may be connected in parallel rather than in series as shown herein. It is preferred, however, to connect the batteries in series as this provides a convenient means by which the motor 20 can be energized at higher voltages thus enabling higher starting torques and more rapid spinning speeds. Various lights and audible and mechanical devices may also be adapted to the gyro. It is also envisioned that some of the batteries 44 need not be electrically connected to the motor 20 but are incorporated in the motor 12 as spares for later use. These spare batteries would, however, still serve as weights for increasing the rotor mass. Moreover, solar cells, as set forth hereinafter, could be used as the energy source instead of batteries.

FIG. 6 is an exploded view of the embodiment of the invention mentioned hereinbefore in which a structure is set forth having a single battery with counterbalancing means. The rotor body comprises an upper housing 86 and an interfitting lower housing 88. The upper housing 86 and the lower housing 88 are mounted for relative rotation by means of a slip fit guide ring 89. Mounted within the housings is a motor 90 encased in a motor housing 92. Projecting from the motor 90 is a spin axis member or stator 94. A stator extension member 96 frictionally fits over each of the projecting ends of the stator 94. Each stator extension is provided with a slot 98 for inserting a taut string therein thereby permitting the powered gyro to move along the string.

The energy source in the present construction is a single battery 100 which is mounted in the lower housing 88 and is provided with conducting means 102. Also mounted in lower housing 88 is a flexible contact member 104 and a ballast or counterweight 106. Electrical wires 108 connect the conducting means 102 and the flexible contact member 104 to the motor 90.

Figure 8:
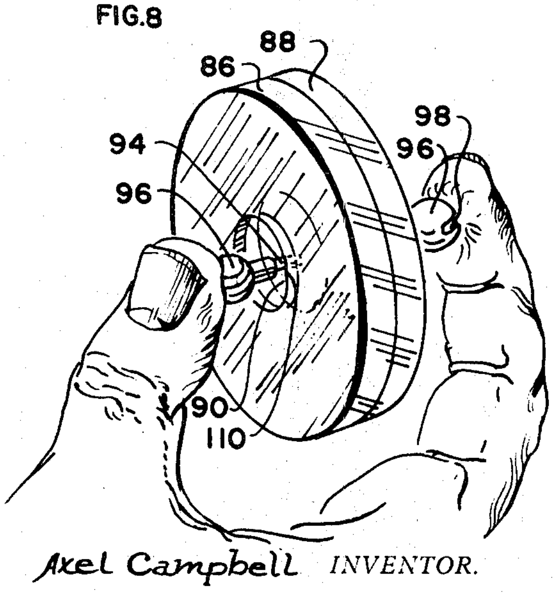
FIG. 8 is another perspective view of the unit shown in FIG. 7.

The upper housing 86 is provided with an aperture 110 for the passage therethrough of stator 94 and stator extension member 96. Additionally, a trip cam 112 is rigidly mounted in a selected location in the upper housing whereby upon rotation of the upper housing 86 relative to the lower housing 88 the trip cam engages the flexible contact member 104 and bends the same into contact with conducting means 102 to close the circuit through the battery 110. FIG. *9a* shows the open position of the switch while FIG. *9b* illustrates the closed position thereof. The element 113 is a friction clutch pad for differential rotation of the powered gyro on smooth surfaces. Thus, the rotation of the spin axis member or stator at a greater rotational speed will be considerably reduced by the clutch pad on a smooth surface thereby permitting movement of the gyro on a smooth surface. FIG. 7 discloses the assembled gyro while FIG. 8 demonstrates how the powered gyro constructed according to the teachings of the present invention may be held readily between two fingers of the hand, and thus the spinning gyro may be supported in any position, as a result of the unobstructed stator passing through the top and bottom of the motor and rotor respectively.

FIG. 10 discloses an alternate embodiment of the present invention. The lower housing 88 is shown with a snap fastener ball member 87. Mounted within the lower housing 88 is a centrifugal harness 114 having battery 100 positioned in one side thereof while ballast or counterweight 106 is mounted in the opposite side thereof. A conducting means 116 connects the motor 90 to the conducting arms 118 and 120, respectively. Conducting arm 120 is permanently electrically connected to the battery 100 while conducting arm 118 is pivoted at 117 to the harness 114. A switch operator finger piece 122 projects through the opening 124 in the lower housing 88. It should be noted that both the upper and lower housings are provided with keyways 121, and the harness 114 with an aligned opening 123. Mounted through the aligned keyways 121 and opening 123 is a motor 90 encased in motor housing 92. End caps 91 are located in the motor housing and have axially centered holes which function as bushings for the extended stator or spin axis member 94. FIG. 10*a* is a top plan view of FIG. 10 while FIG. 11 is a view of FIG. 10 with the switch 122 closed. FIG. 12 is a view of FIG. 10 with the switch 122 in the open position. FIG. 14 shows the details of construction of the centrifugal harness 114 having a battery container opening 125, and it should be noted that a high number of revolutions of the gyro are possible through this construction because of the central fastening of the seams, rather than a peripheral closure of the harness structure.

FIGS. 15, 16 and 17 show various possible arrangements of the rotor upper and lower housings 86 and 88 about the motor housing 92. In FIG. 15, the rotor has a center of gravity in a low plane through the motor housing. FIG. 16 illustrates the rotor located in a median plane through the extended motor housing while FIG. 17 discloses the rotor in a high plane through the motor housing. Thus, in FIGS. 10–17, the rotor is positioned about and in a plane perpendicular to the motor housing. A study of FIGS. 15–17 will reveal that the rotor selectively stationed in various perpendicular planes through the motor housing will cause changing inertial effects from different centers of gravity through various planes through the motor housing.

FIGS. 18 and 19 are directed to an embodiment of the present invention in which an inner wall 137 surrounds the motor. Spaced from inner wall 137 is an outer wall 139 and in the space in between is located electro-reactive material 141 for producing electricity to drive the device. The electrical energy from material 141 is transmitted to the terminals 34 and 36 by means of leads 132 connected to the material 141. Either of the leads 132 may be selectively interrupted by a switching means (not shown). Insulated brushes 32 project through the inner motor wall 137 and make contact with the commutator 30. The motor housing is provided with an upper wall 133 and a lower wall 145. Between the upper and lower walls and the adjacent portions of the inner wall 137 are also located electro-reactive materials 141. Both the upper wall 143 and the lower wall 145 are provided with apertures through which the spin axis member 14 projects. It should be noted that the structure illustrated in FIGS. 18 and 19 is compact since the energy source is located within the motor housing rather than in a separate structure located about or surrounding the motor housing. Thus, the motor housing itself becomes a rotor unit since it rotates as a unit about the stator.

FIGS. 20 and 21 show a motor housing in the form of a sphere. This spherical housing includes an inner wall 137, electroreactive material 141 and an outer motor wall 139. Electrical leads 132 are connected to terminals 34 and 36. A bushing separator 133 maintains the components of the device in the proper relation within the sphere. The outer wall 139, inner wall 137, computator 30 and brushes 32, as well as spin axis member 14 function as in FIGS. 18 and 19. The spherical form of FIGS. 20 and 21 permits spatial economy thereby creating a compact, rigid device.

FIG. 22 illustrates a gyro powered by an annular battery with solar cells 123. The unit is encased in a transparent housing 126 and the spin axis member 94 is retained in bearing pockets 136. This unit will operate indefinitely due to the fact that the solar cells recharge internal batteries of the type illustrated in FIGS. 18–21 for operation of the device during darkness as well as during daylight hours.

FIGS. 23 and 24 disclose another embodiment of the present invention in which the gyro utilizes an electrical energy source in the form of an annular battery 124 which also functions as the rotor of the device. This annular battery 124 permits a high degree of accuracy in balancing the unit. It should also be noted that the present device may be used in navigational systems as well as stable platforms.

The device of FIGS. 23 and 24 comprises a support frame 126. The motor housing 92 is secured within the internal opening of annular battery 124. The motor 90 is provided with a lower switch contact 128 and an upper switch contact 130. Connecting switch contacts 128 and 130 to the annular battery 124 are electrical wires 132. The upper stator 94 has a low friction bushing 134 slidable thereon, and both the upper and lower parts of the stator 94 have free ends that are received in stator bearings 136. A switch pressure arm 138 is provided with a bifurcated extremity 140 at one end thereof and a finger knob 142 at the other end thereof. The arm 138 passes through a detent opening 144 in the support frame 126. Thus, the movement of the switch pressure arm 138 by grasping knob 142 and moving the arm to the part **144*a* of the detent opening 144 will cause the bifurcated extremity 100 to engage and push down the bushing 134 until the latter abuts and moves the upper switch contact 130 into engagement with the lower switch contact 128 thereby making the circuit and causing the gyro to be powered by the annular battery 126**, the latter also functioning as the rotor of the device.

Figures 25, 26, 27, 28:
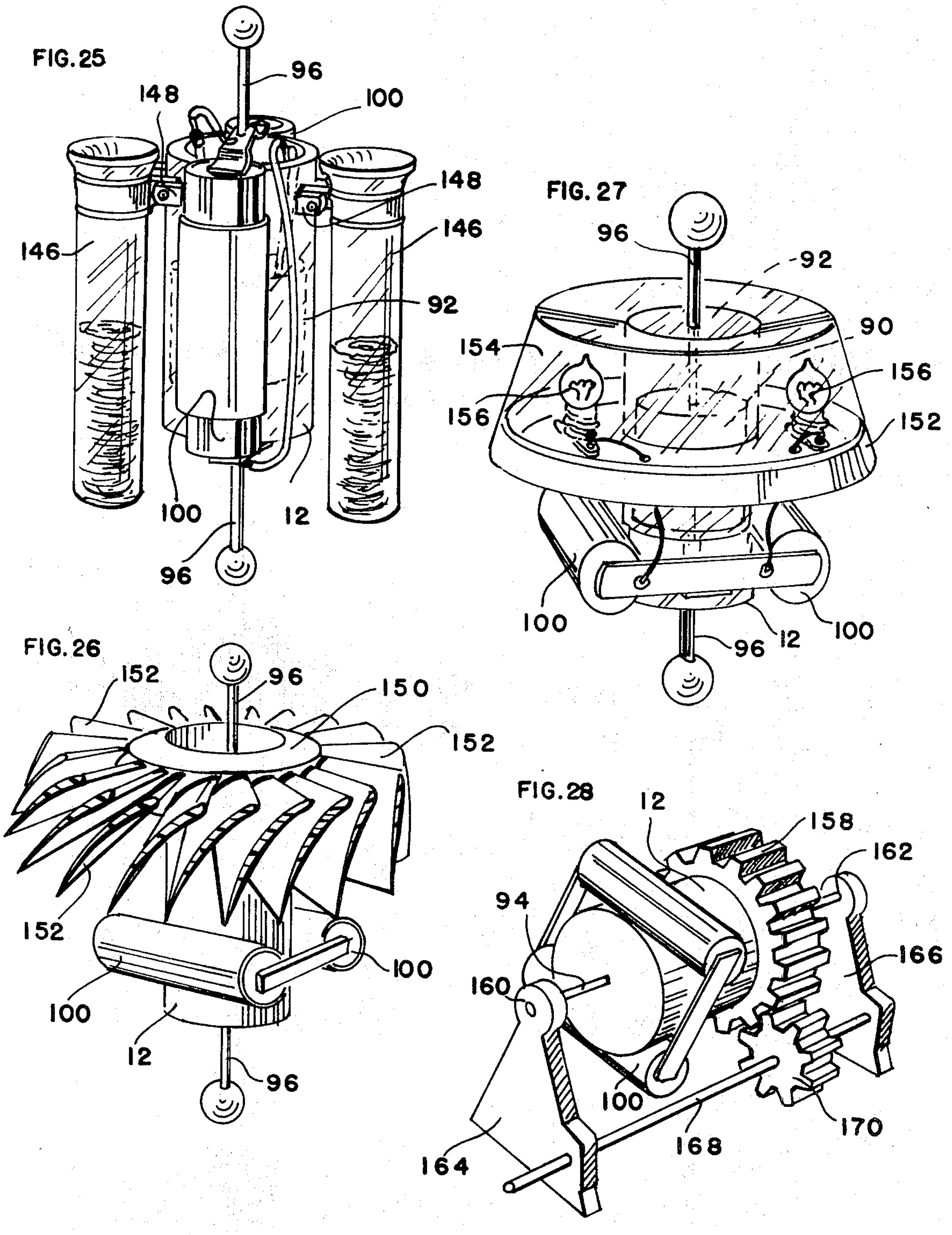

FIGS. 25–28 illustrate various methods of employing the present invention. In FIGS. 25–28 the rotor body 12 is provided with batteries 100, or a battery and a counterweight (not shown) to achieve the proper balancing of the unit. In FIG. 25 a pair of centrifuge devices 146 are mounted on the rotor body 12 by means of brackets 148. Thus, the rotation of the rotor body 12 will cause the centrifuging of the substances in the centrifuge devices 146.

FIG. 26 discloses a rotor body 12 having a collar 150 fitting thereover. The collar 150 is provided with a plurality of fan blades 152 to form a portable cooling fan, or an air effect device for flight.

FIG. 27 shows a rotor body 12 provided with a housing 152 having a transparent cover 154. Mounted on the housing 152 are lights 156, the latter being electrically connected to the batteries 100. Accordingly, when the housing 152 is rotated with the rotor body 12 the lights project a desirable lighting effect through the transparent cover 154.

FIG. 28 illustrates a rotor body 12 having an annular gear 158 surrounding the rotor body 12. The spin axis member 94 is journalled into openings 160 and 162 of frame members 164 and 166. Also fixed in frame members 164 and 166 is a shaft 168 upon which is mounted a shaft 168 having a gear 170 thereon. The gears 158 and 170 are meshed so that rotation of the rotor body 12 causes the gears to operate together.

What is claimed is:

1. A self-propelled gyro top comprising in combination; an electric motor having a stator element, an armature element, an armature shaft supporting said armature element for relative rotation of said armature element and said stator element; a rotor body surrounding said motor and supported by one of said relatively rotating elements for rotation; a plurality of batteries located about said motor and in a plane through the peripheral planes of said motor for inertial mass purposes; and conductive elements electrically connected to said batteries to supply electrical energy to said motor thereby producing relative rotation of said armature element.

2. A self-propelled gyro top as set forth in claim 1 further comprising switch means to interconnect said conductive elements including a switch operator, guide means for said switch operator permitting said operator to be moved linearly to a position wherein at least part of said switch operator engages at least one of said conductive elements to thereby make the electrical circuit.

3. A self-propelled gyro top as set forth in claim 2 further comprising detent means in said switch means for maintaining said switch operator in the make position of the electric circuit.

4. A self-propelled gyro top as set forth in claim 1 wherein said batteries are remotely positioned relative to said armature shaft axis to provide said rotor body with a relative large inertial moment about said armature shaft axis.

5. A portable self-propelled electromotive gyro device comprising in combination: an electric motor having a spin axis member, a rotor, at least one battery, means for counterbalancing said battery for dynamic operation, said battery and counterbalancing means being carried by said rotor and being arrayed outside the planes of the peripheral surface parallel to the longitudinal axis of said motor whereby said spin axis member projects out of opposite sides of said rotor; and conductive elements electrically connected to said battery to supply electrical energy to said motor thereby permitting rotation of said rotor relative to said spin axis member.

6. A portable self-propelled electromotive gyro device as claimed in claim 5 further comprising a normally open switch connected to said conductive elements, and a switch operator located in said rotor for engaging said switch and completing the electrical circuit from the battery to said motor.

7. A portable self-propelled electromotive gyro device as claimed in claim 5 wherein said rotor comprises a bipartite housing, and the battery and counterbalancing means being located partly in one of said housings and partly in the other of said housings.

8. A portable self-propelled electromotive gyro device as claimed in claim 5 further comprising a sleeve-like stator extension provided with a slotted knob extremity, said stator extension being adapted to frictionally fit over said spin axis member.

9. A portable self-propelled electromotive gyro device as claimed in claim 5 wherein said motor is mounted substantially vertically and said rotor is placed around said planes of said motor in a generally horizontal plane, said rotor being located below the horizontal center plane of said motor.

10. A portable self-propelled electromotive gyro device as claimed in claim 5 wherein said motor is mounted substantially vertically and said rotor is placed around said planes of said motor in a generally horizontal plane, said rotor being located in the horizontal center plane of said motor.

11. A portable self-propelled electromotive gyro device as claimed in claim 5 wherein said motor is mounted substantially vertically and said rotor is placed around said planes of said motor in a generally hirizontal plane, said rotor being located above the horizontal center plane of said motor.

12. A portable self-propelled electromotive gyro device as claimed in claim 5 further comprising a harness for both said battery and counterbalancing means, a switch pivotally mounted on said harness and being operatively connected to said conductive elements and said battery.

13. A portable self-propelled electromotive gyro device as claimed in claim 5 further comprising a gyro support frame, a normally open switch mounted on said gyro support frame, a low friction slidable bushing on said spin axis member, a switch pressure arm having one end adapted to engage said bushing and a knob at the other end thereof for manual operation to slide said bushing into a position whereby said switch is closed.

14. A portable self-propelled electromotive gyro device as claimed in claim 5 further comprising a fan mounted on said rotor.

15. A portable self-propelled electromotive gyro device as claimed in claim 5 further comprising a centrifuge assembly mounted on said rotor.

16. A portable self-propelled electromotive gyro device as claimed in claim 5 further comprising at least one electric light mounted on said rotor and powered from said battery.

17. A portable self-propelled electromotive gyro device as claimed in claim 5 further comprising a gear arrangement including one gear mounted on said rotor and adapted to mesh with another gear.

18. A portable self-propelled electromotive gyro device comprising in combination; an electric motor having a spin axis member, a rotor, a balance annular battery carried by said rotor and being positioned about the planes generated by the peripheral surfaces of said motor, and conductive elements electrically connected to said battery to supply electrical energy to said motor thereby causing rotation of said rotor relative to said spin axis member.

19. A portable self-propelled electromotive gyro device as claimed in claim 18 wherein said battery is integral with said rotor to form a mass which acts as a motor housing about said spin axis member for relative rotation therewith.

20. A portable self-propelled electromotive gyro device as claimed in claim 18 wherein said battery performs as a rotor and provides electrical energy for the relative rotation of the rotor and said spin axis member.

21. A self-propelled gyro top comprising in combination; an electric motor having a stator element, an armature element, an armature shaft supporting said armature element for relative rotation of said armature element and said stator element, a rotor body surrounding said motor and supported by one of said elements for rotation, a plurality of batteries located about said motor and in a plane through the peripheral planes of said motor for inertial mass properties, and conductive elements electrically connected to said batteries to supply electrical energy to said motor to thereby produce said relative rotation of said armature element, said rotor body being bipartite with corresponding recesses in the interface surfaces of said body parts, each of said batteries being positioned in adjacent corresponding recesses of said rotor body.

References Cited

UNITED STATES PATENTS

| | | | |
|---|---|---|---|
| 2,623,327 | 12/1952 | Testino | 46—228 |
| 3,019,555 | 2/1962 | Poticha | 46—243 |
| 3,137,093 | 6/1964 | Ulrich | 46—243 |
| 3,246,427 | 4/1966 | Tuuri | 46—243 |
| 3,253,365 | 5/1966 | Calderon | 46—243 |

FOREIGN PATENTS

| | | |
|---|---|---|
| 1,009,079 | 5/1957 | Germany. |

LOUIS G. MANCENE, Primary Examiner

R. F. CUTTING, Assistant Examiner

U.S. Cl. X.R.

46—50, 67, 71